(12) United States Patent
Hassan (10) Patent No.: US 11,010,379 B2
(45) Date of Patent: *May 18, 2021

(54) INCREASING PERFORMANCE OF IN-MEMORY DATABASES USING RE-ORDERED QUERY EXECUTION PLANS

(71) Applicant: SAP SE, Walldorf (DE)

(72) Inventor: Ahmad Hassan, Belfast (GB)

(73) Assignee: SAP SE, Walldorf (DE)

(*) Notice: Subject to any disclaimer, the term of this patent is extended or adjusted under 35 U.S.C. 154(b) by 394 days.

This patent is subject to a terminal disclaimer.

(21) Appl. No.: 15/677,700

(22) Filed: Aug. 15, 2017

(65) Prior Publication Data

US 2019/0057131 A1 Feb. 21, 2019

(51) Int. Cl.
*G06F 16/2453* (2019.01)
*G06F 16/2458* (2019.01)
*G06F 17/18* (2006.01)

(52) U.S. Cl.
CPC .... *G06F 16/24542* (2019.01); *G06F 16/2462* (2019.01); *G06F 16/24539* (2019.01); *G06F 17/18* (2013.01)

(58) Field of Classification Search
USPC ........................................................ 707/741
See application file for complete search history.

(56) References Cited

U.S. PATENT DOCUMENTS

| | | | |
|---|---|---|---|
| 5,845,325 A | 12/1998 | Loo | |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 | 10/2005 | Lahiri et al. | |
| 7,085,751 B2 | 8/2006 | Finlay et al. | |
| 7,181,578 B1 | 2/2007 | Guha | |
| 7,360,073 B1 | 4/2008 | Billstrom et al. | |
| 7,434,002 B1 | 10/2008 | Zedlewski et al. | |

(Continued)

FOREIGN PATENT DOCUMENTS

WO 2016167824 10/2016

OTHER PUBLICATIONS

U.S. Office Action in related U.S. Appl. No. 15/213,816 dated Jun. 18, 2019, 46 pages.

(Continued)

*Primary Examiner* — Muluemebet Gurmu
(74) *Attorney, Agent, or Firm* — Fish & Richardson P.C.

(57) ABSTRACT

Implementations of the present disclosure include methods, systems, and computer-readable storage mediums for receiving a query from an application, determining that the query has been received before, and in response, retrieving statistics for the query from a metadata table, providing a query execution plan (QEP) associated with the query, the QEP including a plurality of operators executed to provide a query result, one or more operators of the plurality of operators requiring input from computer-readable memory, fragmenting at least one operator of the plurality of operators into multiple fragment operators to provide a fragmented QEP (fQEP), the multiple operators being executed to each provide a portion of a result of the at least one operator, and storing the fQEP in computer-readable memory.

20 Claims, 4 Drawing Sheets

(56) References Cited

U.S. PATENT DOCUMENTS

| | | |
|---|---|---|
| 7,624,381 B1 | 11/2009 | Czajkowski et al. |
| 7,765,200 B2 | 7/2010 | Kandil et al. |
| 7,774,556 B2 | 8/2010 | Karamcheti et al. |
| 7,840,397 B2 | 11/2010 | Chiou |
| 7,958,329 B2 | 6/2011 | Holt |
| 8,170,859 B1 | 5/2012 | Christensson et al. |
| 8,185,471 B1 | 5/2012 | Walker et al. |
| 8,214,191 B2 | 7/2012 | Ferren et al. |
| 8,230,395 B1 | 7/2012 | Koh et al. |
| 8,456,905 B2 | 6/2013 | Kasorla |
| 8,572,051 B1 | 10/2013 | Chen et al. |
| 8,862,588 B1 | 10/2014 | Gay |
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2 | 2/2015 | Gounares et al. |
| 9,043,530 B1 | 5/2015 | Sundaram et al. |
| 9,304,913 B2 | 4/2016 | Dong et al. |
| 9,348,539 B1 | 5/2016 | Saxena |
| 9,626,327 B2 | 4/2017 | Eilert et al. |
| 9,652,380 B2 | 5/2017 | Byun et al. |
| 9,672,158 B2 | 6/2017 | Karamcheti et al. |
| 9,712,538 B1 | 7/2017 | Vincent et al. |
| 9,720,925 B1 | 8/2017 | Lawson |
| 9,720,967 B2 | 8/2017 | Lee et al. |
| 9,740,438 B2 | 8/2017 | Hassan |
| 9,841,914 B2 | 12/2017 | Hassan |
| 9,846,550 B2 | 12/2017 | Muralimanohar |
| 10,083,183 B2 | 9/2018 | Hassan |
| 10,698,732 B2 | 6/2020 | Hassan |
| 2001/0027387 A1 | 10/2001 | Miyake et al. |
| 2003/0033431 A1 | 2/2003 | Shinomiya |
| 2003/0065648 A1 | 4/2003 | Driesch et al. |
| 2003/0065688 A1* | 4/2003 | Dageville et al. ........ G06F 7/00 707/999.205 |
| 2004/0184340 A1 | 9/2004 | Dwarkadas |
| 2004/0193935 A1 | 9/2004 | Kato et al. |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2006/0218123 A1* | 9/2006 | Chowdhuri et al. .... G06F 17/30 707/999.002 |
| 2006/0218125 A1 | 9/2006 | Kandil et al. |
| 2007/0050328 A1 | 3/2007 | Li |
| 2007/0050609 A1 | 3/2007 | Ferren et al. |
| 2007/0162425 A1 | 7/2007 | Betawadkar et al. |
| 2007/0202473 A1 | 8/2007 | Koda |
| 2007/0226186 A1 | 9/2007 | Ewen et al. |
| 2008/0005476 A1 | 1/2008 | Venkatesan |
| 2008/0034179 A1 | 2/2008 | Mewhinney et al. |
| 2008/0109592 A1 | 5/2008 | Karamcheti et al. |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0024568 A1* | 2/2009 | Al-Omari et al. ....... G06F 17/30 707/999.002 |
| 2009/0049234 A1 | 2/2009 | Oh et al. |
| 2009/0157952 A1 | 6/2009 | Kim et al. |
| 2009/0157964 A1 | 6/2009 | Kasorla |
| 2009/0182976 A1 | 7/2009 | Agesen et al. |
| 2009/0307462 A1 | 12/2009 | Fleming et al. |
| 2010/0010799 A1 | 1/2010 | Altrichter |
| 2010/0042999 A1 | 2/2010 | Dorai et al. |
| 2010/0153631 A1 | 6/2010 | Moon et al. |
| 2010/0169602 A1 | 7/2010 | Hulbert et al. |
| 2010/0262633 A1 | 10/2010 | Bhattacharjee et al. |
| 2010/0287356 A1 | 11/2010 | Cameron et al. |
| 2010/0306591 A1 | 12/2010 | Krishna |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1 | 4/2011 | Roberts et al. |
| 2011/0131199 A1 | 6/2011 | Simon et al. |
| 2011/0145221 A1 | 6/2011 | Kim et al. |
| 2011/0271264 A1 | 11/2011 | Vorbach et al. |
| 2011/0289126 A1 | 11/2011 | Aikas et al. |
| 2011/0313999 A1 | 12/2011 | Bruno et al. |
| 2012/0072744 A1 | 3/2012 | Jain et al. |
| 2012/0089595 A1 | 4/2012 | Jaecksch |
| 2012/0124318 A1 | 5/2012 | Bivens |
| 2012/0144092 A1 | 6/2012 | Hsieh |
| 2012/0151127 A1 | 6/2012 | Lim |
| 2012/0151252 A1 | 6/2012 | Harris et al. |
| 2012/0158799 A1 | 6/2012 | Morsi et al. |
| 2012/0246392 A1 | 9/2012 | Cheon |
| 2012/0290768 A1 | 11/2012 | Rubowitz et al. |
| 2013/0013860 A1 | 1/2013 | Franceschini |
| 2013/0074092 A1 | 3/2013 | Gounares et al. |
| 2013/0080621 A1 | 3/2013 | Jain et al. |
| 2013/0081005 A1 | 3/2013 | Gounares et al. |
| 2013/0086309 A1 | 4/2013 | Lee |
| 2013/0103380 A1 | 4/2013 | Brandstatter et al. |
| 2013/0226903 A1 | 8/2013 | Wu et al. |
| 2013/0246698 A1 | 9/2013 | Estan |
| 2013/0275716 A1 | 10/2013 | Nishida |
| 2013/0283250 A1 | 10/2013 | Eichenberger |
| 2013/0326109 A1 | 12/2013 | Kivity |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0189204 A1 | 7/2014 | Sugimoto et al. |
| 2014/0258266 A1 | 9/2014 | Craunes et al. |
| 2014/0280685 A1 | 9/2014 | Magenheimer |
| 2014/0281212 A1 | 9/2014 | Schreter et al. |
| 2014/0281249 A1 | 9/2014 | Waldsperger |
| 2014/0282455 A1 | 9/2014 | Felch |
| 2014/0293801 A1 | 10/2014 | Dimou |
| 2014/0310462 A1 | 10/2014 | Waldspurger et al. |
| 2014/0351411 A1* | 11/2014 | Woods et al. ........... H04L 29/08 709/224 |
| 2014/0372428 A1 | 12/2014 | Mathis et al. |
| 2015/0012465 A1 | 1/2015 | Pingenot |
| 2015/0062736 A1 | 3/2015 | Kim et al. |
| 2015/0077426 A1 | 3/2015 | Kweon et al. |
| 2015/0081300 A1 | 3/2015 | Kim |
| 2015/0089604 A1 | 3/2015 | Mathew |
| 2015/0106582 A1 | 4/2015 | Mai et al. |
| 2015/0154087 A1 | 6/2015 | Jin et al. |
| 2015/0169226 A1 | 6/2015 | Shen et al. |
| 2015/0199126 A1 | 7/2015 | Jayasena |
| 2015/0206574 A1 | 7/2015 | Greathouse |
| 2015/0261818 A1* | 9/2015 | Attaluri ............... G06F 16/2456 707/714 |
| 2015/0309789 A1 | 10/2015 | Thorat |
| 2015/0363319 A1 | 12/2015 | Qi |
| 2015/0370560 A1 | 12/2015 | Tan |
| 2015/0378169 A1 | 12/2015 | Naeimi |
| 2016/0019132 A1 | 1/2016 | Vilakkunnadathil |
| 2016/0117241 A1 | 4/2016 | Shah et al. |
| 2016/0117258 A1 | 4/2016 | Karamcheti et al. |
| 2016/0125927 A1 | 5/2016 | Wei |
| 2016/0150003 A1 | 5/2016 | Magdon-Ismall |
| 2016/0179685 A1 | 6/2016 | Byun et al. |
| 2016/0188217 A1 | 6/2016 | Golander et al. |
| 2016/0196112 A1 | 7/2016 | Edwards et al. |
| 2016/0196324 A1 | 7/2016 | Haviv et al. |
| 2016/0205174 A1 | 7/2016 | Pitio et al. |
| 2016/0005423 A1 | 8/2016 | Neppalli et al. |
| 2016/0253093 A1 | 9/2016 | Zhang |
| 2016/0283393 A1 | 9/2016 | Kawaba |
| 2016/0321048 A1 | 11/2016 | Matsuura |
| 2016/0328169 A1 | 11/2016 | Hassan |
| 2016/0336069 A1 | 11/2016 | Lin |
| 2016/0378169 A1 | 12/2016 | Naeimi |
| 2016/0378829 A1 | 12/2016 | Vengerov |
| 2016/0378977 A1 | 12/2016 | Alme et al. |
| 2017/0010817 A1 | 1/2017 | Lim |
| 2017/0010952 A1 | 1/2017 | Nandakumar et al. |
| 2017/0052741 A1 | 2/2017 | Hassan |
| 2017/0052742 A1 | 2/2017 | Hassan |

(56) References Cited

U.S. PATENT DOCUMENTS

| | | |
|---|---|---|
| 2017/0060740 A1 | 3/2017 | Doerner |
| 2017/0090776 A1 | 3/2017 | Kowles |
| 2017/0091334 A1 | 3/2017 | Kabiljo et al. |
| 2017/0115892 A1 | 4/2017 | Gokita |
| 2017/0116210 A1 | 4/2017 | Park et al. |
| 2017/0147516 A1 | 5/2017 | De |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1 | 7/2017 | Agesen et al. |
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1 | 8/2017 | Eilert et al. |
| 2017/0223046 A1 | 8/2017 | Singh |
| 2017/0242595 A1 | 8/2017 | Niu |
| 2017/0255674 A1 | 9/2017 | Attaluri et al. |
| 2017/0289000 A1 | 10/2017 | Parks et al. |
| 2017/0301386 A1 | 10/2017 | Parks et al. |
| 2017/0352012 A1 | 12/2017 | Hearn et al. |
| 2018/0024750 A1 | 1/2018 | Hassan |
| 2018/0024754 A1 | 1/2018 | Hassan |
| 2018/0024755 A1 | 1/2018 | Hassan |
| 2018/0024821 A1 | 1/2018 | Hassan |
| 2018/0024913 A1 | 1/2018 | Hassan |
| 2018/0024922 A1 | 1/2018 | Hassan |
| 2018/0024923 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
U.S. Appl. No. 14/704,461, filed May 5, 2015, Ahmad Hassan.
U.S. Appl. No. 14/831,567, filed Aug. 20, 2015, Ahmad Hassan.
U.S. Appl. No. 14/831,624, filed Aug. 20, 2015, Ahmad Hassan.
U.S. Appl. No. 15/213,621, filed Jul. 19, 2016, Ahmad Hassan.
U.S. Appl. No. 15/213,626, filed Jul. 19, 2016, Ahmad Hassan.
U.S. Appl. No. 15/213,654, filed Jul. 19, 2016, Ahmad Hassan.
U.S. Appl. No. 15/213,674, filed Jul. 19, 2016, Ahmad Hassan.
U.S. Appl. No. 15/213,754, filed Jul. 19, 2016, Ahmad Hassan.
U.S. Appl. No. 15/213,816, filed Jul. 19, 2016, Ahmad Hassan.
U.S. Appl. No. 15/213,861, filed Jul. 19, 2016, Ahmad Hassan.
U.S. Appl. No. 15/213,930, filed Jul. 19, 2016, Ahmad Hassan.
U.S. Appl. No. 15/213,960, filed Jul. 19, 2016, Ahmad Hassan.
U.S. Appl. No. 15/214,019, filed Jul. 19, 2016, Ahmad Hassan.
U.S. Appl. No. 15/214,082, filed Jul. 19, 2016, Ahmad Hassan.
U.S. Appl. No. 15/214,102, filed Jul. 19, 2016, Ahmad Hassan.
Office Action in U.S. Appl. No. 15/213,930 dated Feb. 26, 2019, 35 pages.
Final Office Action issued in U.S. Appl. No. 15/214,082 dated Mar. 8, 2019, 41 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
U.S. Office Action in related U.S. Appl. No. 15/213,754 dated May 23, 2019, 32 pages.
Chen et al., ""SRAM: Flexible Sequential and Random AccessMemory for Embedded Systems"" Laboratory for Advanced Research in Computing Technoiogy arid Compilers Technical Report No. ARCTiC; Mar. 1, 2004, 6 pages.
Dulloor et al., "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menncached over High Performance Networks" 2012 41st International Conference on Parallel Processing, IEEE, Sep. 10, 2012, 10 pages.
Wang et al., ""NVMalloc: Exposing an Aggregate SSD Store as a Memory Partition in Extreme-Scale Machines"" 2012 IEEE 26thInternational Parallel and Distributed Processing Symposium, May 21, 2012, 12 pages.
Final office action issued in U.S. Appl. No. 15/213,626 dated Oct. 18, 2019, 41 pages.
Final office action issued in U.S. Appl. No. 15/213,674 dated Oct. 18, 2019, 43 pages.
U.S. Office Action in related U.S. Appl. No. 15/213,754 dated Jan. 29, 2019, 29 pages.
U.S. Office Action in related U.S. Appl. No. 15/213,816 dated Feb. 7, 2019, 27 pages.
U.S. Office Action in related U.S. Appl. No. 15/214,102 dated Feb. 6, 2019, 34 pages.
Dhiman et al., "PDRAM A hybrid PRAM and DRAM main memory system," Proceedings of the 46th Annual Design Automation Conference, Jul. 26-31, 2009, pp. 664-669.
Hassan et al., "Analytical models and techniques for Software-Managed Energy-Efficient Hybrid DRAM/NVM Main Memory," AMC International Conference on Computing Frontiers 2015, May 18-21, 2015.
Hassan et al., "Energy-Efficient In-Memory Data Stores on Hybrid Memory Hierarchies," Eleventh International Workshop on Dada Management on New Hardware, Jun. 2015, last retrieved from https //event.cwi.nl/damon2015/slides/slides-hassan.pdf on Jan. 5, 2018.
Hu et al., "Data allocation optimization for hybrid scratch pad memory with sram and nonvolatile memory," IEEE Transactions on Very Large Scale Integration (VLSI) Systems, Jun. 2013, 21(6) 1094-1102.
Li et al., "Assert(!Defined(Sequential I/O))," Proceedings of the 6th USENIX Conference on Hot Topics in Storage and File Systems, Jun. 17-18, 2014, 1-5.
Luk et al., "Pin Building Customized Program Analysis Tools with Dynamic Instrumentation," ACM Sigplan Notices, Jun. 2005, 40(6) 190-200.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.

(56) References Cited

OTHER PUBLICATIONS

U.S. Office Action in related U.S. Appl. No. 15/213,930 dated Oct. 20, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jan. 11, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
Wang et al., "Optimizated Allocation of Data Variables to PCM/DRAM-based Hybrid Main Memory for Real-Time Embedded Systems," Embedded Systems Letters, IEEE, Sep. 2014, 6(3) 61-64.
Non-final office action issued in U.S. Appl. No. 15/214,082 dated Sep. 6, 2019, 36 pages.
Final office action issued in U.S. Appl. No. 15/213,654 dated Jul. 18, 2019, 21 pages.
Final office action issued in U.S. Appl. No. 15/214,082 dated Mar. 19, 2020, 38 pages.
Non-final office action issued in U.S. Appl. No. 15/213,674 dated Jan. 30, 2020, 38 pages.
Final office action issued in U.S. Appl. No. 15/213,816 dated Jan. 2, 2020, 43 pages.
Non-Final Office Action issued in U.S. Appl. No. No. 15/213,626 dated Jun. 9, 2020, 45 pages.

* cited by examiner

INCREASING PERFORMANCE OF IN-MEMORY DATABASES USING RE-ORDERED QUERY EXECUTION PLANS

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

In-memory computing has been a driver in the design of enterprise applications in terms of functionality, real-time process management, and real-time decision making. Advances in processing and memory systems have triggered the transition of enterprise applications to in-memory database technology, where all desired data is kept in main memory for high throughput processing.

Also, cloud computing has enabled the software as a service concept where the databases can be spawned for the users as per need. However, in a typical use case, the databases run on virtual machines, which share resources with other virtual machines running on the same physical node. Applications hosted in a cloud environment are constrained by the amount of memory and processing resources available therein.

SUMMARY

Implementations of the present disclosure include computer-implemented methods for using fragmented query execution plans (fQEPs) to increase performance in in-memory database systems. In some implementations, actions include receiving a query from an application, determining that the query has been received before, and in response, retrieving statistics for the query from a metadata table, providing a query execution plan (QEP) associated with the query, the QEP including a plurality of operators executed to provide a query result, one or more operators of the plurality of operators requiring input from computer-readable memory, fragmenting at least one operator of the plurality of operators into multiple fragment operators to provide a fQEP, the multiple operators being executed to each provide a portion of a result of the at least one operator, and storing the fQEP in computer-readable memory. Other implementations include corresponding systems, apparatus, and computer programs, configured to perform the actions of the methods, encoded on computer storage devices.

These and other implementations may each optionally include one or more of the following features: the at least one operator includes a join operator, and fragmenting the at least one operator includes: determining an input column to the at least one operator as a largest input column, dividing the input column, and providing a fragment operator for each division of the input column; the at least one operator is identified for fragmentation based on a statistic of the at least one operator; the statistic for the at least one operator is provided from profile data of the QEP, the profile data being determined based on a first execution of the QEP; during execution of the fQEP, at least one of the fragment operators receives input data from a cache; execution of the fQEP results in decreased execution time relative to an execution time of the QEP; and actions further include: receiving source code of the application, providing an instrumented application that includes the source code and instrumentation code, the instrumented application including at least one instruction for profiling the plurality of operators, executing the instrumented application to process the QEP to provide a profiling file, the profiling file indicating, for each operator in the plurality of operators, respective start times and end time, and, for each operator in the plurality of operators, determining a respective execution time based on a respective start time and a respective end time.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to using fragmented query execution plans (fQEPs) to increase performance in-memory database systems. In some implementations, actions can include receiving a query from an application, determining that the query has been received before, and in response, retrieving statistics for the query from a metadata table, providing a query execution plan (QEP) associated with the query, the QEP including a plurality of operators executed to provide a query result, one or more operators of the plurality of operators requiring input from computer-readable memory, fragmenting at least one operator of the plurality of operators into multiple fragment operators to provide a fQEP, the multiple operators being executed to each provide a portion of a result of the at least one operator, and storing the fQEP in computer-readable memory.

To provide context for implementations of the present disclosure, real-time data analytics aim at making knowledge available with sub-second and often sub-millisecond response time. For example, real-time enterprise resource planning (ERP) systems enable enterprises to view every change in the enterprise as soon as it happens, and can be a driver in the success of the enterprise. In some examples, real-time access to information helps in gaining competitive advantage through efficient and improved (e.g., more informed) decision making, product pricing, risk management, product life-cycle, customer feedback, customer engagement, brand development, product pricing, and reduced total cost of ownership (TCO). The growing volumes of enterprise data makes it challenging to achieve the target response times in real-time data analytics.

The advances in multi-core processing, caching and less expensive main memory has brought a major breakthrough in designing real-time enterprise systems. In-memory databases open doors for real-time analytics as it uses faster main-memory as a primary storage and bypass I/O disk delays in analytical data processing. Improvements in both hardware and in-memory databases have triggered the unification of both operational and analytical storage models together in a unified in-memory data store. For example, slower, disk-based memory is only required for persistent storage. This has a negligible impact on the throughput of in-memory databases, because persistence is moved from the critical path. Accordingly, in-memory databases enable real-time data analytics on unified data with minimal response times, because the data resides in main memory, which is an order of magnitude faster for accessing than traditional, disk-based memory.

Main memory may include one or more types of memory (e.g., DRAM, NVM) that communicates with one or more processors, e.g., CPU(s), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA, provided by SAP SE of Walldorf, Germany.

In-memory databases can be implemented in hybrid memory systems, which can include non-volatile memory (NVM) and dynamic random access memory (DRAM). In general, NVM provides persistence (like a traditional hard disk), and byte-addressability (like conventional DRAM). NVM is also referred as storage class memory (SCM). Examples NVM include phase change memory (PCM), spin transfer torque memory (STT-RAM), and memristors. DRAM uses capacitance to store electric charge, which requires continuous power due to leakage. NVM uses resistance, rather than capacitance, for bit representation. Both DRAM and NVM consume static energy and dynamic energy. Static energy is consumed at all times when the memory system is switched on, and is independent of any memory accesses. Dynamic energy is an energy that is consumed by an actual read or a write operation (memory accesses). NVM memories provide non-volatility which means that they do not lose data upon power failure. For example, power to an NVM can be switched off and on without losing any data. This feature is not provided by DRAM. DRAM is volatile and loses data as soon as it loses charge, because DRAM is a capacitance-based technology. Moreover DRAM needs continuous refresh power in order keep data alive, because capacitors continuously leak power with time.

NVM provides a unique way of persistence than traditional hard disk memory. Because NVM is byte-addressable, data can be persisted data at the level of individual bytes. This means that the CPU load and store operations can be directly persisted on the NVM.

With regard to querying databases, when a query (e.g., SQL query) is issued to a database, the database system internally represents the query in the form of a QEP. However, it is difficult to predict which operators of the QEP will cause most of the overhead in terms of main memory accesses. The execution time of the queries within the database is proportional to the number of main memory accesses, and the latency of the main memory. With the emergence of NVM as the main memory, the read and write operation cost and energy are even more significant. This is because NVM is slower than DRAM, but more energy efficient. Accordingly, a goal is to determine an ideal partitioning of a database operator, such that the data fits within on-chip caches, and the number of accesses to the main memory are reduced. If there is too much of a partition, then overhead in the form of resource contention occurs.

In view of the above context, and as described in further detail herein, implementations of the present disclosure are generally directed to partitioning QEPs, such that the maximum amount of data fits within on-chip caches. In some implementations, this is achieved incrementally on every execution of the same queries. This approach is beneficial in terms of analytics, because analytical workloads run the same query again and again for several times. Implementations of the present disclosure show that the number of writes going to main memory are significantly reduced, as compared to traditional QEP handling. Implementations of the present disclosure not only avoid the slow write latency of NVM, but also increase the lifetime of the NVM, as NVM devices deteriorate with every write operation.

In further detail, implementations of the present disclosure optimize database operators for NVM in such a way that minimal load and store operations are served from main memory, whereas most operations are served from on-chip caches. Implementations of the present disclosure learn from previous memory access patterns, and provide a tool for obtaining the memory accesses of each database operator with minimal overhead.

Figure 1:
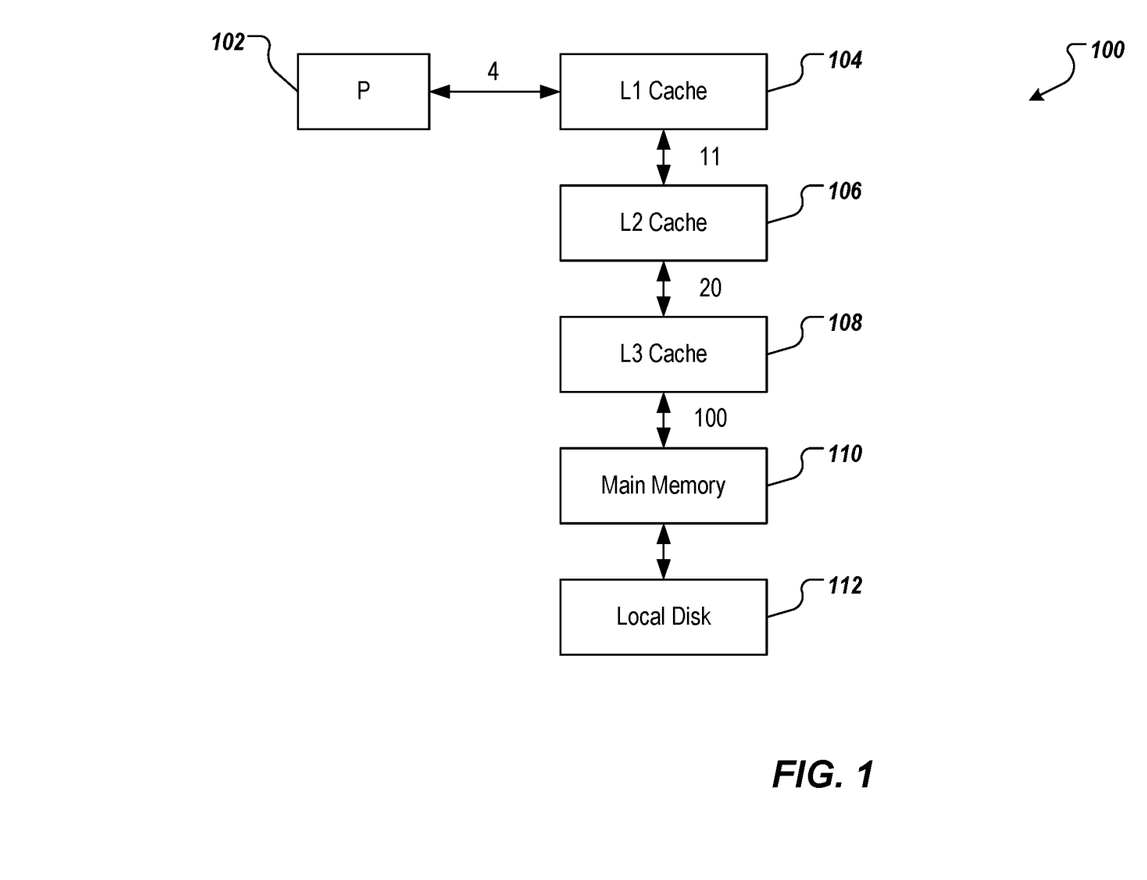
FIG. 1 depicts an example memory access path.

FIG. 1 depicts an example memory access path 100. The example memory access path 100 depicts a hardware resource pipeline for a processor 102 (e.g., a core) to access data from a memory architecture. In the depicted example, the memory architecture includes a multi-level cache having first, second, and third level caches 104, 106, 108, respectively, main memory 110, and disk-based memory 112. The example of FIG. 1 further depicts example latencies (e.g., in terms of average CPU cycles) between components. In some examples, the first and second level caches 104, 106 are on-chip caches, which are located on the processing core. Consequently, the first and second level caches 104, 106 have relatively lower latencies. In some examples, the third level cache 108 is shared by multiple processing cores. Consequently, the third level cache 108 has a higher latency (e.g., 20 CPU cycles) than the first and second level caches 104, 106. The main memory 110 is associated with a much higher latency (e.g., 100 CPU cycles). For example, if data requested by the processor 102 is not available in any of the first, second, and/or third level caches 104, 106, 108, the data is requested from the main memory 110, and ultimately from the highest latency disk-based memory 112, if also not in the main memory 110.

As described in further detail herein, implementations of the present disclosure provide fragmented QEPs (fQEPs). As noted above, a query is internally represented internally as a set of steps that constitute a QEP. More generally, all queries are broken down in to n number of steps, which can depend on the degree of parallelism or partitioning of database tables. Example operations of an example QEP can include: look-up metadata, perform selection operation, perform aggregation operation, perform join operation, and perform merge operation. In accordance with implementations of the present disclosure, the most time consuming operations of the QEP are determined, and a dictionary is provided, where a key to the dictionary is the line number of the QEP, and a value is the time taken by that line during execution of the query. In a subsequent iteration, time-consuming database operators are fragmented, by splitting the single operator into multiple operators (e.g., splitting an operator into two oprators).

In accordance with implementations of the present disclosure, partitioning of the database operator enables the data required for the operator to fit within the on-chip cache(s). In this manner, the number of accesses to the main memory are reduced, because the data is accessed directly form the on-chip cache(s). Reducing the number of main memory access operations results in a reduction in the the overall time consumed by the multiple operators. Although multiple operators replace the single operator, the memory access time is better than the single operator alone. This is because main memory is the slowest of all memories in the in-memory data processing pipeline.

To illustrate implementations of the present disclosure, an example QEP and respective fQEP are discussed in further detail. The example QEP is associated with a benchmark query that can be processed in accordance with implementations of the present disclosure. Example benchmark queries can include queries provided in the TPC Benchmark H (TPC-H) provided by the Transaction Processing Performance Council of San Francisco, Calif. The TPC-H is a decision support benchmark that includes a set of business oriented ad-hoc queries (e.g., a set of benchmark queries), and concurrent data modifications. The TPC-H is described as being representative of decision support systems that examine large volumes of data, execute queries with a high degree of complexity, and provide answers to critical business questions. Although implementations are described in further detail herein with reference to an example TPC-H benchmark query, it is contemplated that implementations of the present disclosure can be realized using any appropriate query and respective QEP.

To illustrate implementations of the present disclosure, query number 11 (Q11) of the TPC-H will be discussed. In some examples, the TPC-H includes a set of 22 queries, where Q11 is entitled "Important Stock Identification Query," and is executed to find the most important subset of suppliers' stock in a given nation. More specifically, Q11 finds, from scanning the available stock of suppliers in a given nation, all the parts that represent a significant percentage of the total value of all available parts, and the query result displays the part number and the value of those parts in descending order of value. To execute Q11, a QEP is provided. Listing 1, below, provides excerpts from the QEP of Q11:

1 $X\_33$:=calc.str (3, 7, 0, 0, "GERMANY", 25);
    2 $X\_167$:=calc.str (3, 7, 0, 0, "GERMANY", 25);
    3 $X\_1$:=sql.mvc ( );
    . . .
    24 $X\_39$:=sql.projectdelta ($X\_28$, $X\_31$, $X\_34$, $r1\_62$, $X\_37$);
    25 ($X\_80$, $r1\_208$):=algebra.join ($X\_79$, $X\_39$); HIGH COST
    26 $X\_55$:=sql.bind ($X\_1$, "sys", "partsupp", "ps_supplycost", 0);
    . . .
    44 $X\_24$:=$X\_21$;
    45 ($X\_25$, $r1\_46$):=algebra.join ($X\_13$, $X\_24$);
    46 $X\_27$:=algebra.leftfetchjoin ($X\_25$, $X\_2$);
    47 ($X\_40$, $r1\_74$):=algebra.join ($X\_27$, $X\_39$); HIGH COST
    48 $X\_65$:=algebra.leftfetchjoin ($r1\_74$, $X\_64$);
    . . .
    79 sql.rsColumn ($X\_108$, "sys.", "value", "decimal", 19, 2, $X\_107$);
    80 $X\_119$:=io.stdout ( );
    Listing 1: Excerpts of QEP for TPC-H Q11

In accordance with implementations of the present disclosure, a profiling tool is used to determine the execution time of each line (operator) of a QEP. In some examples, the profiling tool is provided as an LLVM tool (e.g., LLVM pass). In some examples, executing the QEP for Q11 reveals that line 25 is associated with an execution time of approximately 65,000 milliseconds (ms), and that line 47 is associated with an execution time of approximately 53,000 ms, while the remaining lines are each largely associated with execution times of less than approximately 500 ms. Overall, it can be determined that lines 25 and 47 together account for approximately 99% of the total execution time for the QEP of Q11. Consequently, lines 25 and 47 can be determined to be time-consuming operators of the QEP.

In accordance with implementations of the present disclosure, if the query has not been analyzed before, the query is processed through the profiling tool to determine the number of load/store operations, and energy of each step of the QEP. These values are stored in the dictionary (e.g., in an in-memory metadata store). If the query has been analyzed before, the dictionary is referenced to determine which steps of the QEP are the most time and energy consuming, referred to herein as critical steps (e.g., lines 25 and 47 of the example QEP of Listing 1). After determining the critical steps, partitioning of the operator is applied, such that the operator is divided into m number of steps. In some examples, the operator is partitioned on the largest input database column by dividing it into half, and distributing it across two operators. The following example algorithm captures this workflow:

Let S be the query issued to the database.
    if S is a first time query:
      Generate QEP for S;
      Instrument the database with profiling tool;

Run S and measure the operating cost of each line in terms of load and
store operations, and energy cost; and
Store statistics for each query line in metadata table.
if S is a NOT a first time query:
Search S in the metadata table;
Sort the operators in descending order of energy and latency cost;
For line(s) in the QEP having a memory requirement larger than a threshold:
Find the largest input column,
Divide the column,
Generate operator calls each containing half of the original input column,
Replace the single operator call in the original QEP with multiple operator calls in a fQEP, and
Store the fQEP in the database metadata.
Algorithm 1: Partitioning QEP In some examples, the threshold for the memory requirement in Algorithm 1 is provided as the size of the memory available in the on-chip cache(s).

With reference to Listing 2, below, an example fQEP is provided for the QEP of Listing 1, after performing the partitioning in the first iteration:

1 X_33:=calc.str (3, 7, 0, 0, "GERMANY", 25);
2 X_167:=calc.str (3, 7, 0, 0, "GERMANY", 25);
3 X_1:=sql.mvc ( );
. . .
24 X_39:=sql.projectdelta (X_28, X_31, X_34, r1_62, X_37);
25 (X_80, r1_208_1):=algebra.join (X_79_1, X_39); FRAGMENT 1
26 (X_80, r1_208_2):=algebra.join (X_79_2, X_39); FRAGMENT 2
27 X_55:=sql.bind (X_1, "sys", "partsupp", "ps_supplycost", 0);
. . .
45 X_24:=X_21;
46 (X_25, r1_46):=algebra.join (X_13, X_24);
47 X_27:=algebra.leftfetchjoin (X_25, X_2);
48 (X_40_1, r1_74_1):=algebra.join (X_27_1, X_39); FRAGMENT 1
49 (X_40_2, r1_74_2):=algebra.join (X_27_2, X_39); FRAGMENT 2
50 X_65:=algebra.leftfetchjoin (r1_74, X_64);
. . .
81 sql.rsColumn (X_108, "sys.", "value", "decimal", 19, 2, X_107);
X_119:=io.stdout ( );
Listing 2: Excerpts of fQEP for TPC-H Q11

In terms of the example of FIG. 1, fQEPs are provided, such that data requested by the processor 102 is more often available from the first, second, and/or third level caches 104, 106, 108 thereby reducing the amount of CPU cycles required to perform operations. In other words, a fQEP will execute with more in-cache data than its underlying QEP, thereby improving (decreasing) the response time required for resolving the query. Even though the main memory 110 is a significant advance over the disk-based memory 112 (at least in terms of latency), the main memory 110 is still considered a bottle-neck in high-performance in-memory systems.

The example of Listing 2 provides an example operator, join. In some examples, a join operation is a standard database EQUI-Join operator that joins two columns of the database. In the example of Listing 2, the join operator is divided into two fragments, because a single database column object exceeds the available on-chip cache of the system (e.g., the memory requirement exceeds the threshold, as provided in Algorithm 1). This means that, if the single join is performed using the database column, it is likely that the half of the data is stored in the on-chip caches (level 1, 2, or 3) of the processor, and half of the data is fetched from the DRAMNVM on demand. The objective of the present disclosure, however, is to reduce the main memory access operations. Instead of running a single join on the whole columns, implementations of the present disclosure convert the single join operation into two join operations, and pass half of the database column to each join operation. In this manner, the data is processed within the on-chip caches, and the response time of the query improves significantly as the data is processed most within the on-chip caches.

As noted above, implementations of the present disclosure provide an iterative approach for continued improvements through iterative partitioning. For example, after an initial iteration, subsequent versions of fQEPs can be compared to determine whether a subsequent fQEP (e.g., V2) improves over an immediately previous QEP (e.g., V1), which can include the original QEP, or a fQEP. Algorithm 2, below, provides for QEP selection to iteratively improve QEP performance:

Run the query for the first time:
Then
Profile the QEP and store statistics in the metadata table as shown in
Algorithm 1.
Run the previously profiled query:
Then
Read the last known statistics from the metadata.
Let V1 be the first version and V2 be the newly fragmented version.
Calculate:

$$I = \frac{(LS_{V1} - LS_{V2})}{LS_{V1}}$$

In order to determine the global minima, the values are calculated with respect to the first iteration:

$$\min_{global} = \frac{(LS_{V1} - LS_{IT1})}{LS_{V1}}$$

If there is an improved global minima, the global minima is recorded:

if$(I-\min_{global})>T$, then $\min_{global}=I$

Algorithm 2: QEP Selection

In Algorithm 2, 1 is the improvement level (in terms of execution of time) achieved by V2 over V1, $LS_{V1}$ is the total number of loads/stores in V1, and $LS_{V2}$ is the total number of loads/stores in V2, $\min_{global}$ is the global minima, $LS_{IT1}$ is the total number of loads/stores in the first iteration (IT1), and T is a threshold value that defines the improvement in terms of execution time.

In some implementations, Algorithm 1 and Algorithm 2 operate in conjunction. More particularly, Algorithm 2 is performed to find the ideal number of fragments for repeated queries. If the same query is received by the database several times, Algorithm 2 is performed to determine whether a join operator that was fragmented in the previous iteration can give further benefits by dividing into half again. If it does, then a further fragmentation is provided. Otherwise the previous QEP (e.g., fQEP) is selected for the same query.

Figure 2:
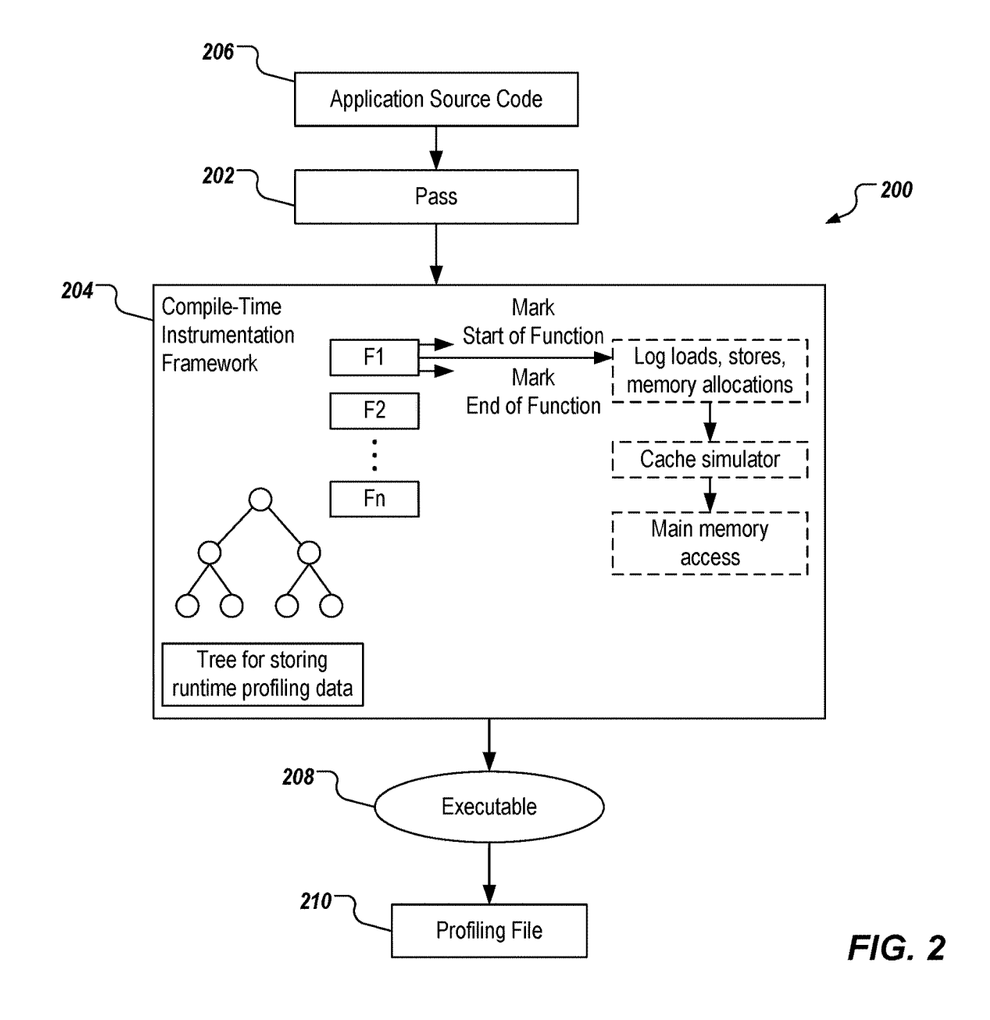
FIG. 2 depicts an example architecture to profile query execution plans (QEPs) in accordance with implementations of the present disclosure.

FIG. 2 depicts an example architecture 200 to profile QEPs in accordance with implementations of the present disclosure. In the depicted example, the example architecture 200 includes a pass 202 (e.g., an LLVM pass), and a compile-time instrumentation framework 204. In some examples, the pass 202 receives application source code 206 (e.g., source code of the application that is to be profiled), and provides executable code 208. In some examples, the pass 202 compiles the source code and adds instrumentation code to provide the executable code 208. In some examples, the instrumentation code includes instructions to profile the application during execution (e.g., objects, sizes, loads/stores of allocations).

In some examples, the executable code 208 is provided as bit-code (e.g., machine-readable code) and is executed by the compile-time instrumentation framework 204 to provide a profiling file 210, as described in further detail herein. In some examples, the profiling file 210 provides, for each operator of an executed QEP, execution time, cache accesses, cache misses, cache evictions, and main memory accesses.

In further detail, the instrumented executable code 208 can be executed to perform queries. During execution of the instrumented executable code 208, all loads and stores performed by the application (e.g., object reads/writes) are collected, and are passed to a cache simulator to identify accesses that go through to main memory (e.g., main memory traffic). For example, a QEP can be executed and, for each operator of the QEP, the following example information can be determined: execution time, cache accesses, cache misses, cache evictions, and main memory accesses. In some examples, the data of the profiling file is used to identify time-consuming operators that are memory-bound, as well as consumers and producers to enable re-ordering of the QEP to provide a fQEP.

Figure 3:
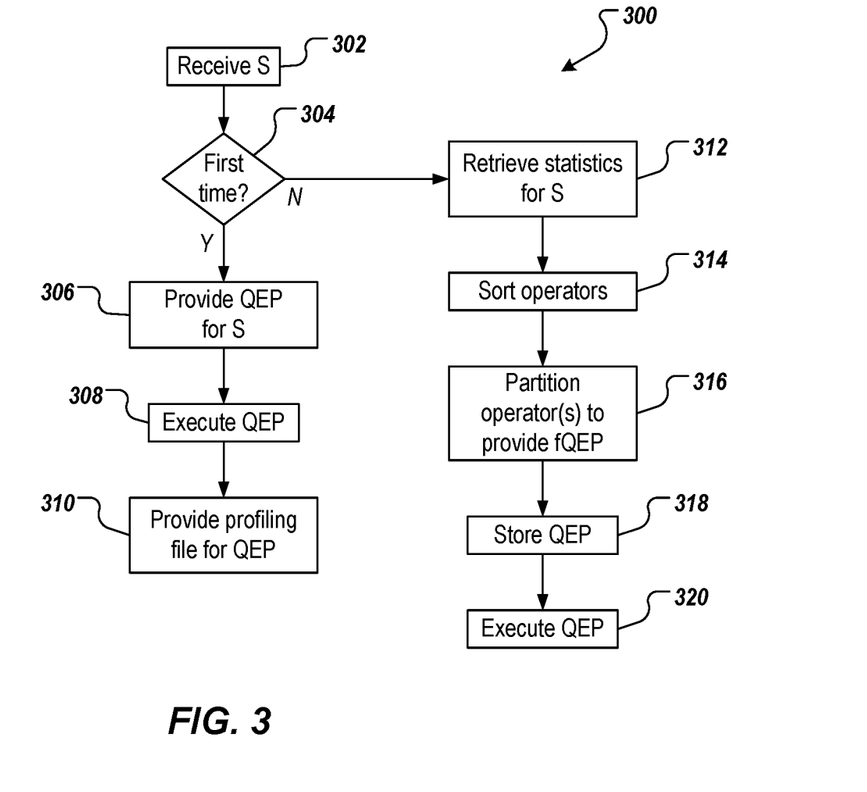
FIG. 3 depicts an example process that can be executed in accordance with implementations such as those of the present disclosure.

FIG. 3 depicts an example process 300 that can be executed in accordance with implementations of the present disclosure. In some implementations, the example process 300 may be performed using one or more computer-executable programs executed using one or more computing devices.

A query (S) is received (302). For example, a query (e.g., SQL query) can be submitted to a database system using an application. In some examples, the application interacts with an in-memory database to provide a result to the query. It is determined whether this is the first time that the query has been received (304). If this is the first time that the query has been received, a QEP is provided (306). In some examples, the QEP is pre-stored in memory, and is retrieved from memory based on the query. In some examples, the QEP includes a plurality of operators provided in respective lines L. For example, the QEP can include lines $L_1, \ldots, L_m$, each line being associated with a respective operator (e.g., $P_1, \ldots, P_m$). In some examples, the operators are performed to provide the query results. The QEP is executed (308). For example, operators of the QEP are executed in line order (e.g., beginning with $L_1$) to provide the query result. In some examples, the QEP is executed as described above with reference to FIG. 2, and a profiling file is provided (310).

If it is not the first time that the query has been received, statistics for the query are retrieved (312). In some examples, a profiling file associated with the query (e.g., generated the first time that the query was executed) is retrieved from computer-readable memory, and stores statistical data (e.g., execution time, cache accesses, cache misses, cache evictions, and main memory accesses) of the query. Operators of the query are sorted based on the statistics (314). For example, operators can be order based on time required to execute. One or more operators are partitioned to provide a fQEP (316). In some examples, a memory requirement for high-cost operators is determined, and compared to a threshold. In some examples, if the memory requirement is below the threshold, partitioning of the operator is applied, such that the operator is divided into m number of steps. In some examples, the operator is partitioned on the largest input database column by dividing it into half, and distributing it across two operators. An example threshold can include the memory capacity of the on-chip cache(s). The fQEP is stored (318), and is executed (320) to provide the query result.

Figure 4:
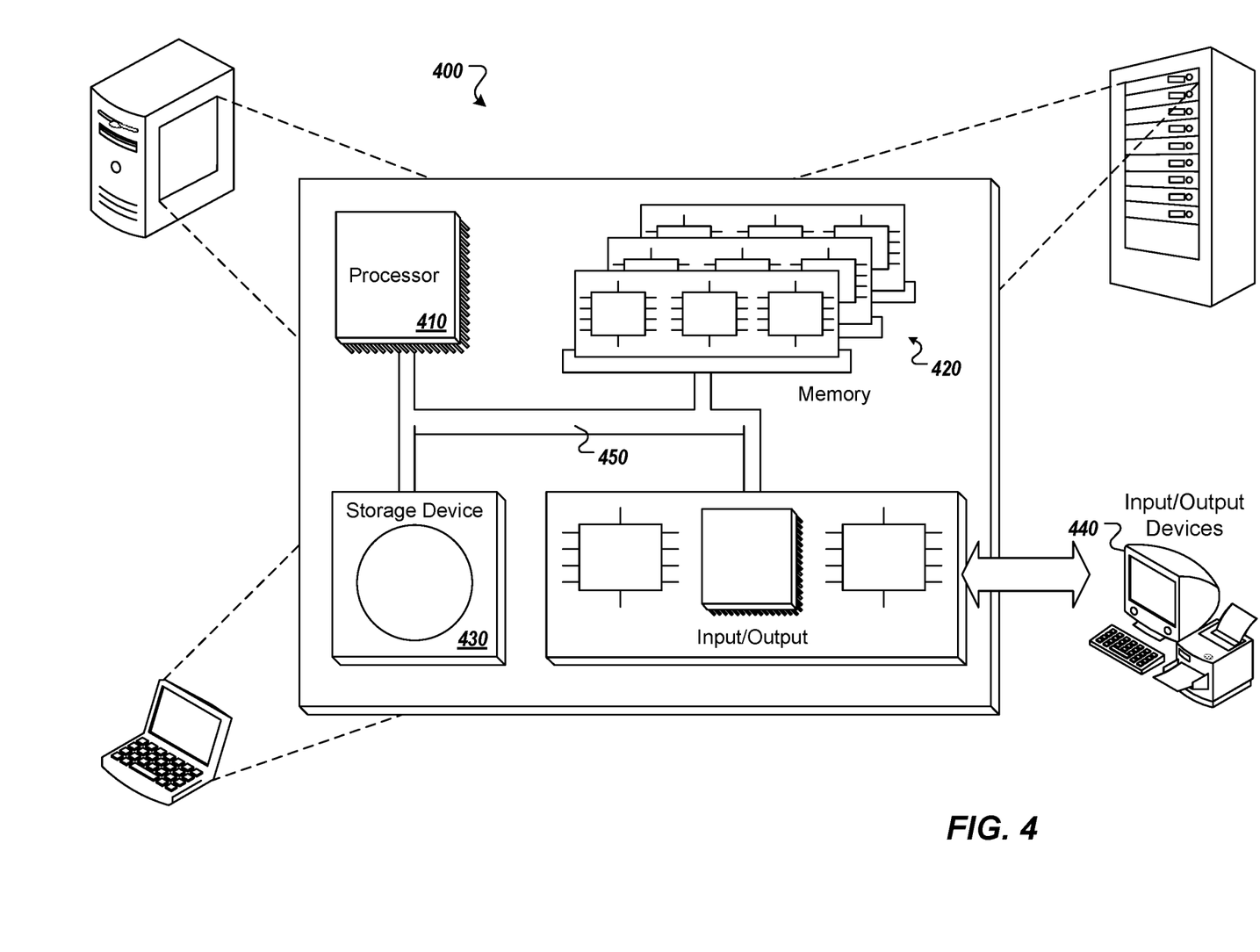
FIG. 4 is a schematic illustration of example computer systems that may be employed for implementations such as those of the present disclosure.

FIG. 4 depicts a schematic diagram of an example computing system 400. The system 400 may be used to perform the operations described with regard to one or more implementations of the present disclosure. For example, the system 400 may be included in any or all of the server components, or other computing device(s), discussed herein. The system 400 may include one or more processors 410, one or more memories 420, one or more storage devices 430, and one or more input/output (I/O) devices 440. The components 410, 420, 430, 440 may be interconnected using a system bus 450.

The processor 410 may be configured to execute instructions within the system 400. The processor 410 may include a single-threaded processor or a multi-threaded processor. The processor 410 may be configured to execute or otherwise process instructions stored in one or both of the memory 420 or the storage device 430. Execution of the instruction(s) may cause graphical information to be displayed or otherwise presented via a user interface on the I/O device 440.

The memory 420 may store information within the system 400. In some implementations, the memory 420 is a computer-readable medium. In some implementations, the memory 420 may include one or more volatile memory units. In some implementations, the memory 420 may include one or more non-volatile memory units.

The storage device 430 may be configured to provide mass storage for the system 400. In some implementations, the storage device 430 is a computer-readable medium. The storage device 430 may include a floppy disk device, a hard disk device, an optical disk device, a tape device, or other type of storage device. The I/O device 440 may provide I/O operations for the system 400. In some implementations, the I/O device 440 may include a keyboard, a pointing device, or other devices for data input. In some implementations, the I/O device 440 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   receiving, by the one or more processors, a query from an application;
   determining, by the one or more processors, that the query has been received before, and in response, retrieving statistics for the query from a metadata table;
   providing, by the one or more processors, a query execution plan (QEP) associated with the query, the QEP comprising a plurality of operators executed to provide a query result, one or more operators of the plurality of operators requiring input from computer-readable memory, the statistics comprising a set of memory requirements, each memory requirement representing an amount of memory a respective operator of the plurality of operators requires to execute;
   identifying at least one operator as a time-consuming operator;
   determining a memory requirement of the at least one operator from the metadata table using a key representing a line number of the at least one operator within the QEP; and
   determining that the memory requirement of the at least one operator exceeds a threshold, the threshold comprising a size of the memory available in one or more on-chip caches, and in response:
      fragmenting at least one operator of the plurality of operators into multiple fragment operators to provide a fragmented QEP (fQEP), each of the multiple fragment operators being executed to provide a portion of a result of the at least one operator, fragmenting of the at least one operator enabling data required for the at least one operator to fit within an on-chip cache instead of main memory; and
      storing the fQEP in computer-readable memory.

2. The method of claim 1, wherein the at least one operator comprises a join operator, and fragmenting the at least one operator comprises:
   determining an input column to the at least one operator as a largest input column;
   dividing the input column; and
   providing a fragment operator for each division of the input column.

3. The method of claim 1, wherein the at least one operator is identified for fragmentation based on a statistic of the at least one operator.

4. The method of claim 3, wherein the statistic for the at least one operator is provided from profile data of the QEP, the profile data being determined based on a first execution of the QEP.

5. The method of claim 1, wherein during execution of the fQEP, at least one of the fragment operators receives input data from a cache.

6. The method of claim 1, wherein execution of the fQEP results in decreased execution time relative to an execution time of the QEP.

7. The method of claim 1, further comprising:
   receiving source code of the application;
   providing an instrumented application that includes the source code and instrumentation code, the instrumented application comprising at least one instruction for profiling the plurality of operators;

executing the instrumented application to process the QEP to provide a profiling file, the profiling file indicating, for each operator in the plurality of operators, respective start times and end time; and for each operator in the plurality of operators, determining a respective execution time based on a respective start time and a respective end time.

8. A non-transitory computer-readable storage medium coupled to one or more processors and having instructions stored thereon which, when executed by the one or more processors, cause the one or more processors to perform operations comprising:

receiving a query from an application;

determining that the query has been received before, and in response, retrieving statistics for the query from a metadata table;

providing a query execution plan (QEP) associated with the query, the QEP comprising a plurality of operators executed to provide a query result, one or more operators of the plurality of operators requiring input from computer-readable memory, the statistics comprising a set of memory requirements, each memory requirement representing an amount of memory a respective operator of the plurality of operators requires to execute;

identifying at least one operator as a time-consuming operator;

determining a memory requirement of the at least one operator from the metadata table using a key representing a line number of the at least one operator within the QEP; and determining that the memory requirement of the at least one operator exceeds a threshold, the threshold comprising a size of the memory available in one or more on-chip caches, and in response:

fragmenting at least one operator of the plurality of operators into multiple fragment operators to provide a fragmented QEP (fQEP), each of the multiple fragment operators being executed to provide a portion of a result of the at least one operator, fragmenting of the at least one operator enabling data required for the at least one operator to fit within an on-chip cache instead of main memory; and storing the fQEP in computer-readable memory.

9. The computer-readable storage medium of claim 8, wherein the at least one operator comprises a join operator, and fragmenting the at least one operator comprises:

determining an input column to the at least one operator as a largest input column;

dividing the input column; and providing a fragment operator for each division of the input column.

10. The computer-readable storage medium of claim 8, wherein the at least one operator is identified for fragmentation based on a statistic of the at least one operator.

11. The computer-readable storage medium of claim 10, wherein the statistic for the at least one operator is provided from profile data of the QEP, the profile data being determined based on a first execution of the QEP.

12. The computer-readable storage medium of claim 8, wherein, during execution of the fQEP, at least one of the fragment operators receives input data from a cache.

13. The computer-readable storage medium of claim 8, wherein execution of the fQEP results in decreased execution time relative to an execution time of the QEP.

14. The computer-readable storage medium of claim 8, wherein operations further comprise:

receiving source code of the application;

providing an instrumented application that includes the source code and instrumentation code, the instrumented application comprising at least one instruction for profiling the plurality of operators;

executing the instrumented application to process the QEP to provide a profiling file, the profiling file indicating, for each operator in the plurality of operators, respective start times and end time; and for each operator in the plurality of operators, determining a respective execution time based on a respective start time and a respective end time.

15. A system, comprising:

a computing device; and a computer-readable storage device coupled to the computing device and having instructions stored thereon which, when executed by the computing device, cause the computing device to perform operations comprising:

receiving a query from an application;

determining that the query has been received before, and in response, retrieving statistics for the query from a metadata table;

providing a query execution plan (QEP) associated with the query, the QEP comprising a plurality of operators executed to provide a query result, one or more operators of the plurality of operators requiring input from computer-readable memory, the statistics comprising a set of memory requirements, each memory requirement representing an amount of memory a respective operator of the plurality of operators requires to execute;

identifying at least one operator as a time-consuming operator;

determining a memory requirement of the at least one operator from the metadata table using a key representing a line number of the at least one operator within the QEP; and determining that the memory requirement of the at least one operator exceeds a threshold, the threshold comprising a size of the memory available in one or more on-chip caches, and in response:

fragmenting at least one operator of the plurality of operators into multiple fragment operators to provide a fragmented QEP (fQEP), each of the multiple fragment operators being executed to provide a portion of a result of the at least one operator, fragmenting of the at least one operator enabling data required for the at least one operator to fit within an on-chip cache instead of main memory; and storing the fQEP in computer-readable memory.

16. The system of claim 15, wherein the at least one operator comprises a join operator, and fragmenting the at least one operator comprises:

determining an input column to the at least one operator as a largest input column;

dividing the input column; and providing a fragment operator for each division of the input column.

17. The system of claim 15, wherein the at least one operator is identified for fragmentation based on a statistic of the at least one operator.

18. The system of claim 17, wherein the statistic for the at least one operator is provided from profile data of the QEP, the profile data being determined based on a first execution of the QEP.

19. The system of claim 15, wherein, during execution of the fQEP, at least one of the fragment operators receives input data from a cache.

20. The system of claim 15, wherein execution of the fQEP results in decreased execution time relative to an execution time of the QEP.

* * * * *